(12) United States Patent
Degner et al.

(10) Patent No.: US 11,858,330 B2
(45) Date of Patent: Jan. 2, 2024

(54) BATTERY SERVICING APPARATUS

(71) Applicant: Cummins Inc., Columbus, IN (US)

(72) Inventors: Brandon S. Degner, Oregon, WI (US); John Ringstad, Oregon, WI (US)

(73) Assignee: Cummins Inc., Columbus, IN (US)

( * ) Notice: Subject to any disclaimer, the term of this patent is extended or adjusted under 35 U.S.C. 154(b) by 149 days.

(21) Appl. No.: 17/400,487

(22) Filed: Aug. 12, 2021

(65) Prior Publication Data

US 2023/0049172 A1 Feb. 16, 2023

(51) Int. Cl.
*B60K 1/04* (2019.01)
*B60L 50/64* (2019.01)

(52) U.S. Cl.
CPC ............... *B60K 1/04* (2013.01); *B60L 50/64* (2019.02); *B60K 2001/0455* (2013.01)

(58) Field of Classification Search
CPC .... B60K 1/04; B60K 2001/0455; B60L 50/64
See application file for complete search history.

(56) References Cited

U.S. PATENT DOCUMENTS

| 8,146,694 | B2 | 4/2012 | Hamidi |
| 2009/0020368 | A1* | 1/2009 | Bogelein |
| 2019/0014718 | A1* | 1/2019 | Uemura |

FOREIGN PATENT DOCUMENTS

| CN | 103400948 B | 11/2013 |
| CN | 209396658 U | 9/2019 |
| CN | 209795447 U | 12/2019 |
| CN | 111775763 A | 10/2020 |
| CN | 112339607 A | 2/2021 |
| DE | 102007025332 A1 | 12/2008 |
| DE | 102013205322 A1 * | 10/2013 |
| KR | 20130040288 A | 4/2013 |
| KR | 20170138694 A | 12/2017 |
| KR | 102117319 B1 | 6/2020 |

* cited by examiner

*Primary Examiner* — James A Shriver, II
*Assistant Examiner* — Nicholas R. Kandas
(74) *Attorney, Agent, or Firm* — Faegre Drinker Biddle & Reath LLP

(57) ABSTRACT

In an electrified vehicle, such as a battery electric vehicle, those with a hybrid powertrain, range extended electric vehicles, or hydrogen powered vehicles, integration of the battery may mean that space is very constrained. Typically this means that there is no feasible method to lift the battery to disengage it from the vehicle or to operate any engagement catches or locks etc. The disclosure provides a roller arrangement which has no translation or actuator requirements in order to allow the battery to have reduced frictional engagement with the battery compartment during installation or removal, and also to be well engaged with the battery compartment once installed. Rollers are provided which drop into recesses in the battery compartment at which point they are removed from load bearing engagement and thus, the recesses serve to locate the battery into the installed state in the compartment.

6 Claims, 7 Drawing Sheets

BATTERY SERVICING APPARATUS

FIELD OF THE DISCLOSURE

The present disclosure relates to a roller mount for a vehicle battery, and more particularly to a roller mount with a roller with its rolling axis in fixed, non-translatable relationship to the mount so that it is able only to rotate about its axis, and which when fixed to a battery, ensures that the roller has its lowest point on its circumference at a position below the lowest face of the battery.

BACKGROUND OF THE DISCLOSURE

Batteries in vehicle applications face many challenges. These challenges include heavy battery weight, small integration space, and lack of battery integration features. Sometimes there is very little room to integrate batteries into a vehicle for service or install. The battery must remain serviceable. Typically, batteries are serviced by being vertically lifted (often with a crane) in and out of a battery compartment. Sometimes due to vehicle structure and battery layout, there may be negligible space above the battery in its installed position and thus, the battery must be translated horizontally in and out for service and installation. In this case, there is not enough room to allow a tool to assist in lifting. This requires the batteries to be slid in and out for service and install.

BRIEF SUMMARY OF THE DISCLOSURE

In an electrified vehicle, such as a battery electric vehicle, those with a hybrid powertrain, range extended electric vehicles, or hydrogen powered vehicles, integration of the battery may mean that space is very constrained. Typically this means that there is no feasible method to lift the battery to disengage it from the vehicle or to operate any engagement catches or locks etc. The disclosure provides a roller arrangement which has no translation or actuator requirements in order to allow the battery to have reduced frictional engagement with the battery compartment during installation or removal, and also to be well engaged with the battery compartment once installed. Rollers are provided which drop into recesses in the battery compartment at which point they are removed from load bearing engagement and thus, the recesses serve to locate the battery into the installed state in the compartment.

Unassisted horizontal installation of batteries can be made easier by implementing such rolling features. These rolling features only require the installer to overcome rolling friction instead of sliding friction. Adding rollers by themselves to the battery structure can be challenging as they either need to be removed after the battery is installed or they need to be part of the mounting structure for the battery. This disclosure overcomes this challenge by allowing the rolling feature to drop away, ensuring the rolling element is not then part of the load path for mounting the batteries.

In summary, the battery has an attached rolling feature that assists in battery install and removal but becomes structurally disengaged when the battery reaches an installed state. This can be done without having to add or remove any components in the process.

In a first aspect, the disclosure provides, a roller mount for a vehicle battery, having a roller in fixed, non-translatable relationship to the mount so that it is able only to rotate about its axis, and which when fixed to a battery, ensures that the roller has its lowest point on its circumference at a position below the lowest face of the battery. Such a mount may be retrofitted to a battery to allow it to be used with the disclosure.

In a second aspect, the disclosure provides a mounting system for a vehicle battery comprising a battery compartment having a battery platform which forms the lower surface of the battery compartment and which has a recess at its distal end, and a roller mount for fixing to the distal end of a battery and having a roller which when the mount is fixed to a battery maintains the roller in a fixed relationship with the lowest surface of the battery so that the lowest circumferential point of the roller is lower than the lowest surface of the battery, and which is aligned so that when a battery is fully inserted into the battery compartment, the roller drops into a recessed part of the battery platform so that the lowest surface of the battery then rests in load bearing engagement with the battery platform and the roller is removed from load bearing engagement with the battery platform since the roller is no longer touching the battery platform.

In a third aspect, the disclosure provides a battery mount system comprising a battery, a battery compartment having a battery platform which forms the lower surface of the battery compartment and which has a recess at its distal end, and a roller mount fixed to the distal end of the battery and having a roller which maintains the roller in a fixed relationship with the lowest surface of the battery so that the lowest circumferential point of the roller is lower than the lowest surface of the battery, and which is aligned so that when the battery is fully inserted into the battery compartment, the roller drops into a recessed part of the battery platform so that the lowest surface of the battery then rests in load bearing engagement with the battery platform and the roller is removed from load bearing engagement with the battery platform since the roller is no longer touching the battery platform.

Advantageously, the edge of the recess has an inclined surface, which extends between the upper surface of the battery platform and the recessed part of the battery platform, and which is positioned to allow the roller to run along the inclined surface as the battery mount moves into or out of the battery compartment, in order to provide a smooth transition between the roller being in the recess, or rolling on the battery platform surface.

By adjusting this surface profile, the relationship between lateral movement of the battery mount and/or battery against vertical movement of the distal end of the battery mount and/or battery can be controlled by design. This may be suitable to avoid a sharp drop of the battery into the battery compartment at the end of its travel, and also to reduce the lateral forces required to remove the battery and cause the distal end of the battery to be lifted by the rollers during such removal.

Additionally, the battery platform may include a longitudinal groove which extends from the recess to the entrance to the battery compartment, and which is laterally aligned with the roller, and wide enough to accept the full width of the roller, so that the roller runs in the groove as the battery mount moves into or out of the battery compartment thereby guiding the lateral position of the roller during rolling before it drops into the recessed part.

In this way, a battery may be guided automatically into the battery compartment without the sides of the battery touching the sides for the battery compartment. With such a groove, the roller is unlikely to ride up the side of the groove as this requires the mass of the battery to be overcome, and thus it tends to remain in a predetermined sideways relationship with the battery compartment walls as defined by the relationship between the position of the roller and the sides of the groove.

BRIEF DESCRIPTION OF THE DRAWINGS

Non-limiting and non-exhaustive embodiments of the present embodiments are described with reference to the following figures, wherein like reference numerals refer to like parts throughout the various views, unless otherwise specified.

Figure 1:
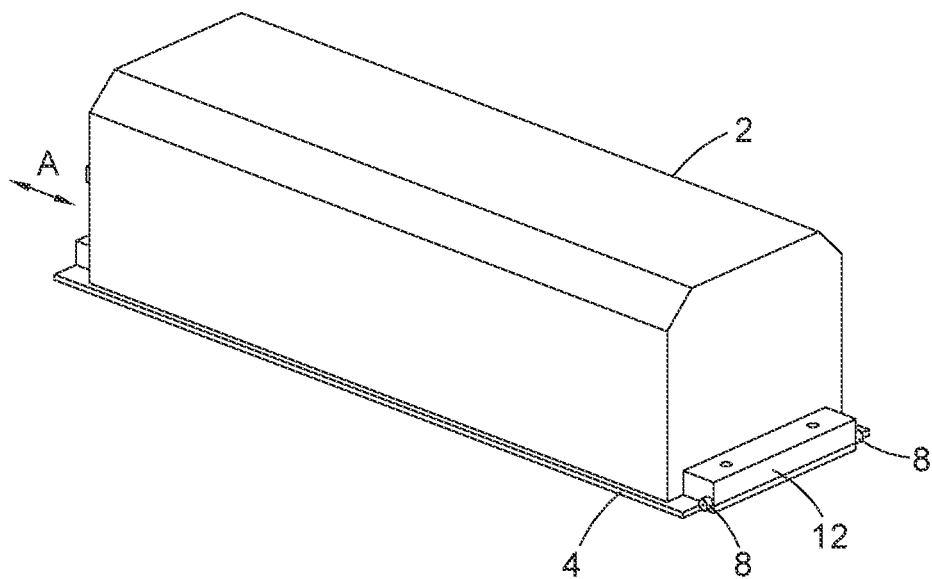
FIG. 1 is a perspective view of a battery with battery mount and rollers.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION OF THE DISCLOSURE

With reference to FIG. 1, a battery 2 is shown resting on a battery platform 4 which forms part of a vehicle and typically the base part of a battery compartment in an electric vehicle. The rest of the vehicle is not shown and the rest of the battery compartment is not shown, but this disclosure is applicable particularly where there is minimal clearance above the battery 2, in the battery compartment, which means that access to the battery from above is not possible and also that during insertion or removal of the battery 2, the battery is not able to be raised to any significant degree and must be translated laterally typically in the direction of the arrow A, in the Figure.

The battery 2 will typically be of conventional construction having multiple cells electrically connected together and be of a rechargeable type technology. In order to provide good energy density, the internal cells will often be closely packed meaning that the battery pack itself has significant mass and is therefore quite difficult to handle in a battery compartment having only slightly larger dimensions than the external dimensions of the battery 2.

Figure 2:
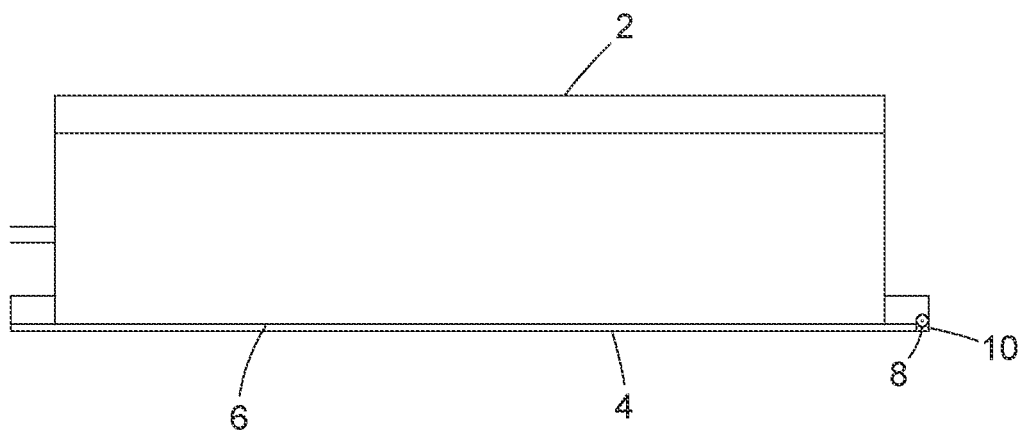
FIG. 2 is a side elevation of a battery with battery mount and rollers with a roller engaged in the recess.
Figure 3:
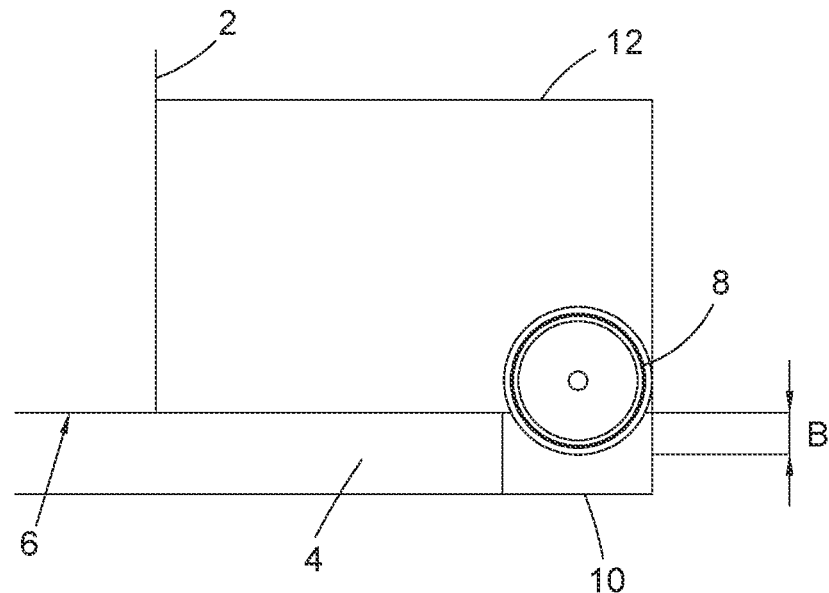
FIG. 3 is an enlarged view of the end of FIG. 2.

FIG. 2 shows a side view of the battery of FIG. 1 and FIG. 3 is an enlargement of the right side of FIG. 2. With reference to these Figures, when installed, the battery lowest surface 6 is supported by the battery platform 4, both of which will generally be flat surfaces so that the load is distributed evenly across the battery platform 4. This arrangement is effective once the battery is installed and provides good location, frictional resistance to movement of the battery in the vehicle battery compartment and good heat dissipation and NVH properties. However, this type of arrangement, because of its relatively high friction characteristics, makes it difficult to manoeuvre the battery laterally in a sliding fashion. Thus, in this embodiment, rollers 8 are provided at the distal end of the battery 2, i.e. the part of the battery that will move first into the vehicle battery compartment and be deepest into the vehicle battery compartment when the battery is in an installed position. The rollers are in a fixed relationship relative to the battery lowest surface 6 and with particular reference to FIGS. 2 and 3, are fixed so that the lower bearing surface of the rollers is below the plane of the battery lowest surface 6. Thus, as the battery 2 is moved along the battery platform 4 during an installation or removal operation, the rollers 8 serve to lift the battery slightly above the battery platform 4 and provide greatly reduced friction between the battery platform 4 and battery lowest surface 6, both through the rolling motion of the rollers themselves and also because the battery lowest surface 6 is no longer in full contact with the battery platform 4. Optionally, and preferably, the proximal end of the battery 2 may be lifted slightly at the same time as being pulled or pushed in the direction of arrow A, which then means that the battery lowest surface 6 has no contact at all with the battery platform 4 and the only resistance to lateral movement is then the friction imposed by the rollers 8.

In this embodiment, the rollers are shown at the distal end of the battery. However, it will be appreciated that the rollers could be mounted part way along the battery and still achieve the same effect. Generally, the rollers will be positioned beyond the centre of gravity of the battery in the distal direction, which means that a lift at the proximal end will remove all parts of the battery from engagement with the platform. However, it is conceivable that the rollers could be positioned at the centre of gravity or on the proximal side of the centre of gravity, meaning that a neutral or downward force would be applied at the proximal end in order to remove the lowest parts of battery from engagement with the platform. The skilled person will thus appreciate that the longitudinal position of the rollers does not necessarily need to be as shown in the drawings in connection with this particular embodiment.

Typically, the rollers 8 are of a generally conventional construction using, for example, steel rollers and needle roller bearings. Thus, the friction introduced by the rollers themselves is relatively low.

Thus, in this way, installation and removal of the battery 2 is greatly eased and only a very small clearance is required above the battery to allow this to happen. The clearance is required to take account of the distance B (see FIG. 3) which the roller 8 protrudes below the battery lowest surface 6, and with a small manufacturing tolerance. If the proximal end of the battery is lifted a similar amount, the battery may be removed or inserted in a generally parallel position to the battery platform 4 but displaced by this distance B.

However, the advantages of having a generally flat engagement between the battery lowest surface 6 and the battery platform 4 are then removed when the rollers are engaged with the platform 4. With this in mind, the platform 4 has recesses 10 into which the rollers 8 are able to drop once the battery is fully installed into the battery compartment. In this way, once the battery is fully installed, the rollers are taken out of load bearing engagement with the battery platform 4 and the load of the battery is taken entirely by the battery lowest surface 6, resting on the battery platform 4. This arrangement also serves to provide engagement of the battery in the battery compartment, as during any lateral movement in the direction A to remove the battery 2, the roller 8 must mount the edge of the platform 4 adjacent the recess 10 against the downward gravitational force acting on the battery mass. In other words, to move the battery in the proximal direction, it is necessary to lift the battery via the roller 8, which translates into a force in the direction A that must be overcome in order to remove the battery.

It will be noted that this arrangement requires no translation or actuation of the rollers. The roller arrangement rolling axis remains static throughout, in a fixed relationship to the battery lowest surface 6. This is simple, convenient, robust and easy to manufacture. This arrangement also allows the battery to be removed with minimal vertical displacement, and yet in the installed position with good engagement with the battery compartment, both through the frictional effects of the battery lower surface and the platform 4 and the engagement of the rollers 8 in the recess 10.

It will also be noted that in this arrangement, not only do the rollers have no need to translate relative to the battery, but also there is no need to have any translating parts in the battery platform. This means that the platform may be machined or cast from a continuous piece and needs no actuators or any other active components in order to engage the battery in place. This is particularly important when one considers that access to the depths of the battery compartment would otherwise need to be provided from some other area of the vehicle as the battery will block access from the entrance to the battery compartment when the battery is installed. This adds yet further to the simplicity and effectiveness of the proposed arrangement.

In the drawings, two rollers are shown mounted on a roller mount 12. The skilled person will appreciate that other arrangements of rollers and roller mount 12 are possible. In this particular arrangement, the roller mount 12 may be manufactured separately from the battery and attached to the distal end of the battery prior to battery installation. This is one convenient way to produce the effect, but other numbers of rollers, including a single long roller may be used. The key point is that the roller is in fixed relation to the lowest surface of the battery 6 and its own lower outer circumference, or bearing surface, is fixed at a lower position than the plane of the battery lowest surface.

In other arrangements, the battery lowest surface and battery platform 4, may not be entirely flat but may, for example, have interlocking patterns. As long as it is possible to lift the battery enough using the rollers and with a lift at the proximal end, during installation or removal of the battery, so that clearance between these features is achievable, then the effect of the disclosure will still be satisfied. Thus, it is not necessary to have completely flat surfaces between the battery and the battery platform.

Figure 4:
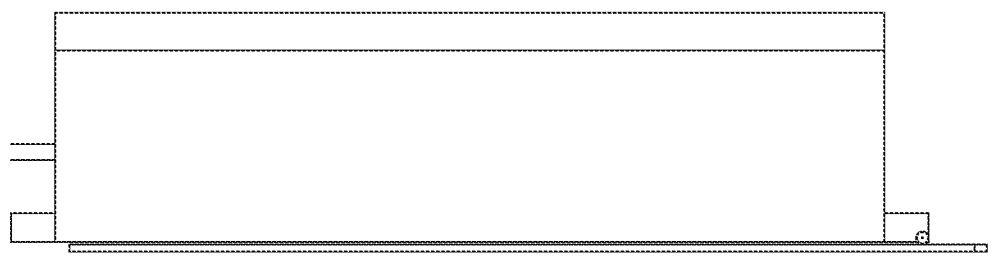
FIG. 4 is a side elevation of a battery in a partially removed or before installation, position before the roller is engaged into the recess.
Figure 5:
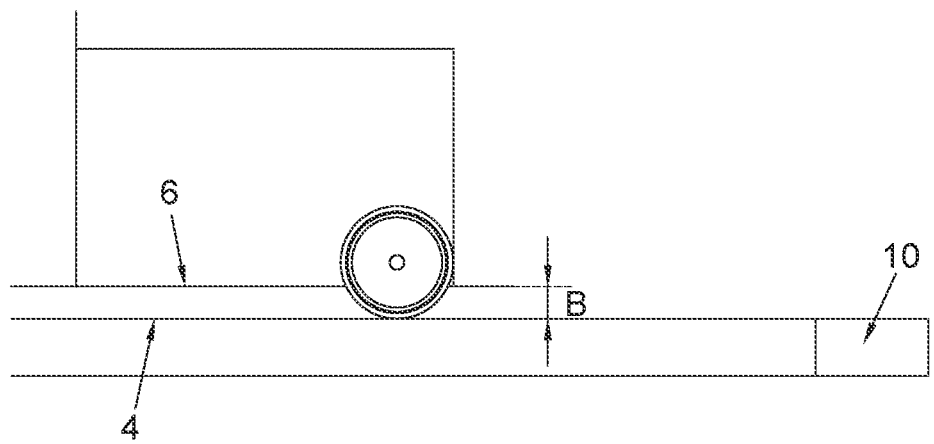
FIG. 5 is an enlarged view of the right side of FIG. 4.
Figure 6:
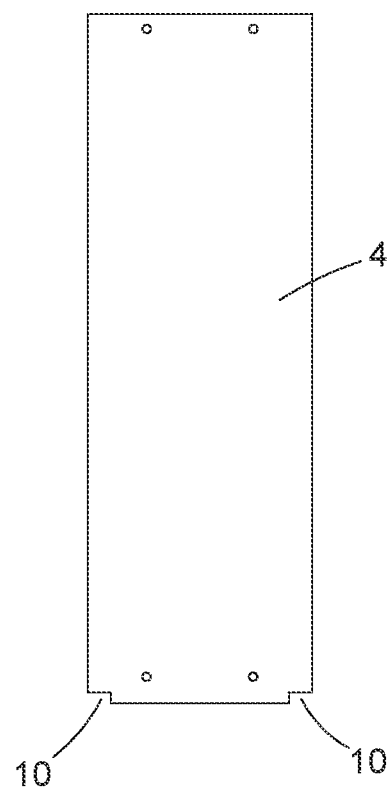
FIG. 6 is a plan view of a battery platform.

For completeness, FIGS. 4 and 5 are equivalent to FIGS. 2 and 3 but show the battery 2 in its part installed arrangement before the rollers 8 have engaged with the recesses 10. With particular reference to FIG. 5, the clearance B can be seen between the battery lowest surface 6 and the battery platform 4. FIG. 6 shows a plan view of the battery platform 4 and shows the nature of the recesses 10, which can simply be cast or machined cut outs in the platform 4, at a position that will correspond with the rollers when the battery is fully inserted, and with the thickness of the platform material providing sufficient depth for the rollers 8 to drop into once the battery is installed. For battery platforms of thicker materials, the recesses may not pass through the entire thickness of the battery platform, they simply need to be deep enough to ensure that the rollers no longer touch the battery platform material in any significant way so that the platform 4 does not impart any significant reaction force on the rollers 8 when the battery is in its fully inserted position in the compartment.

Figure 7:
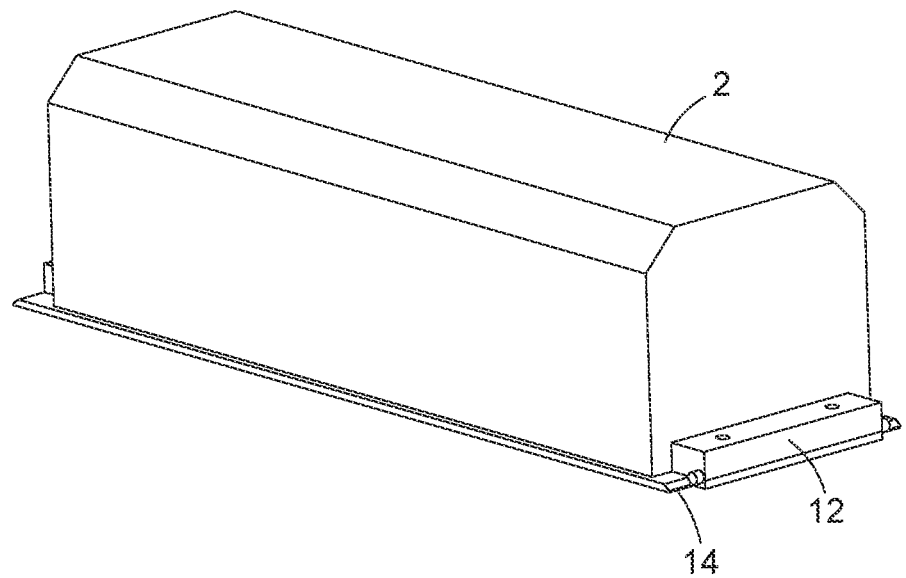
FIG. 7 is a perspective view of a battery platform having a chamfer.
Figure 8:
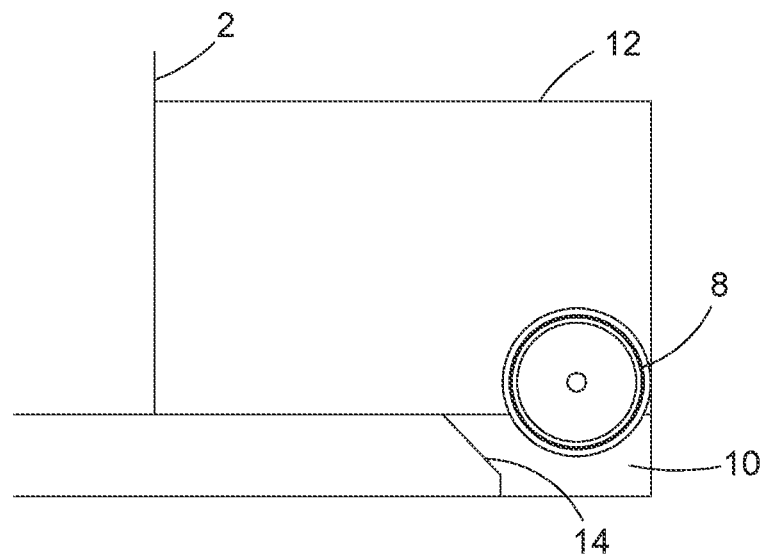
FIG. 8 is an enlarged view of the right side of FIG. 7.
Figure 9:
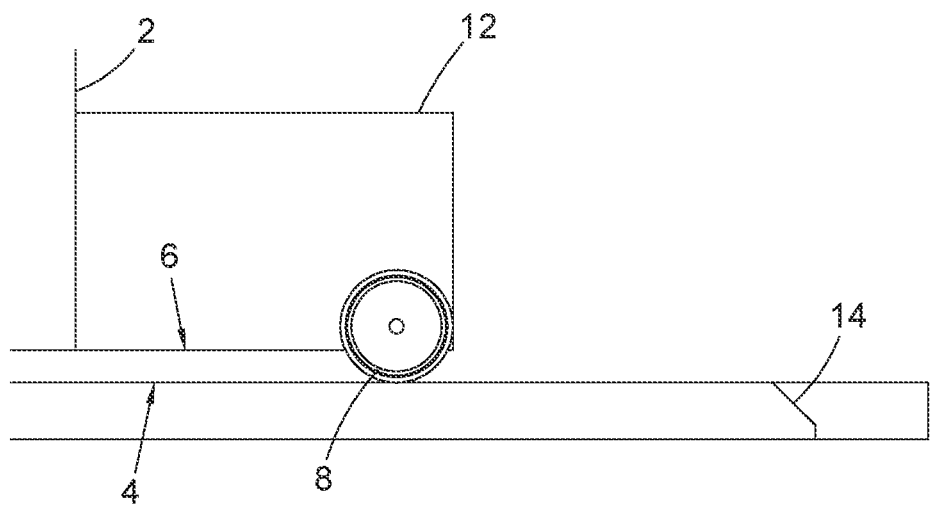
FIG. 9 is a view showing the roller before it enters the chamfered recess.

With reference to FIGS. 7 and 8, the recesses 10 may be enhanced using a ramp or chamfer 14 which has the effect of changing the ratio of lift of the battery during lateral movement in the direction of arrow A and thus reduces the lateral forces required to remove the battery. It also helps to drop the battery more slowly into its final engaged position in the battery compartment. In the drawings, this feature is shown as a linear ramp, but other arrangements with, for example, arcuate profiles, may be appropriate. The profile will be chosen by the skilled person to match the lift at the distal end of the battery with lateral movement of the battery into or out of the battery compartment. The arrangement is effectively a camming arrangement of the profile of the ramp or chamfer 14 with the rollers 8, and therefore the skilled person will readily understand the effect of the profile on the desired insertion and removal characteristics of the battery 2.

Figure 10:
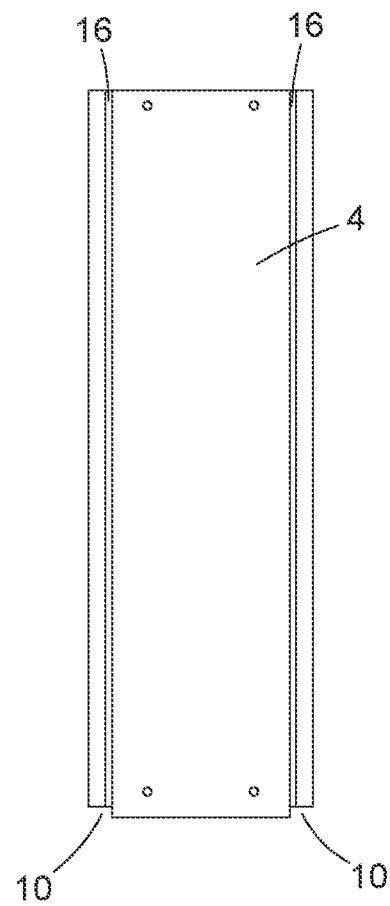
FIG. 10 is a plan view of a battery platform having guide grooves.
Figure 11:
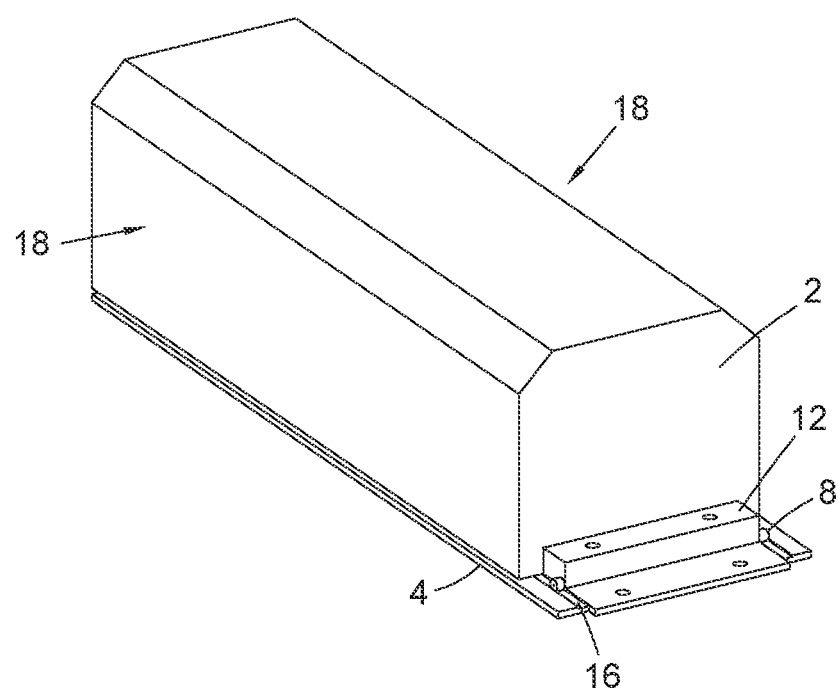
FIG. 11 is a perspective view of a battery platform having guide grooves.
Figure 12:
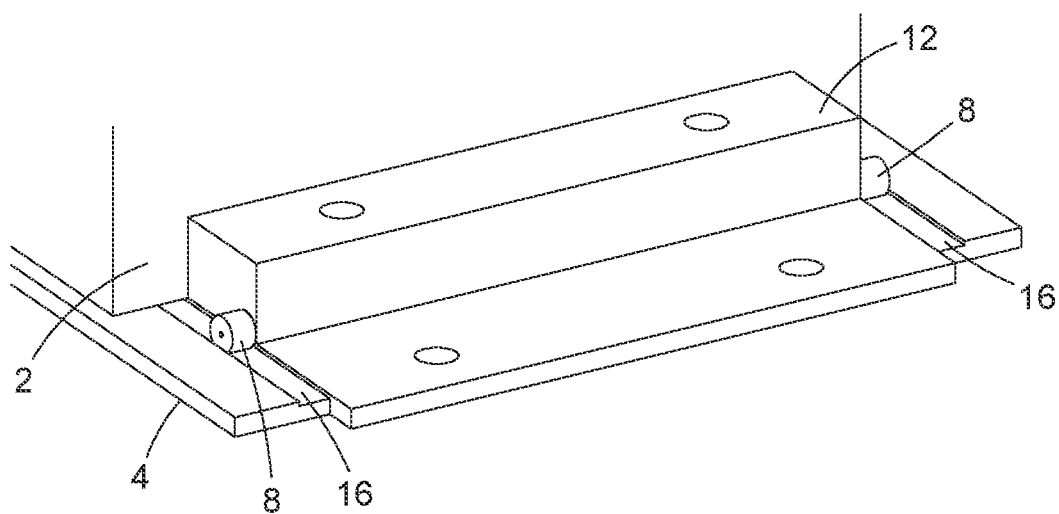
FIG. 12 is an enlarged view of the nearest part of FIG. 11.

In a yet further enhancement shown in FIGS. 10, 11 and 12, which may be used in combination with the chamfer 14 or otherwise, the platform 4 is modified to include grooves 16 into which the rollers 8 run during insertion and/or removal of the battery. This serves to provide a guiding effect for the battery to make sure that it enters the battery compartment squarely and at exactly the desired sideways position in the compartment. This may be particularly useful where there are close constraints on the dimensions between the sides of the battery compartment and the battery sides 18.

In the Figures, the grooves are shown having flat bases, but it will be noted that these could have other profiles and indeed the rollers themselves might have a spherical lower profile and the grooves 16 might themselves have a matching spherical profile. The choice of these profiles would be chosen typically by the skilled person with normal considerations of differences between, for example, plain bearings and roller bearings and the relative distribution of forces and precision of manufacture required. Material hardnesses and the scale of the parts and battery weights will also be considerations to be taken into account.

Persons having ordinary skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope.

The invention claimed is:

1. A mounting system for a vehicle battery comprising:
    a battery compartment having a battery platform which forms the lower surface of the battery compartment and which has a recess; and
    a roller mount for fixing to the vehicle battery and having a roller which when the roller mount is fixed to the vehicle battery maintains the roller in a fixed relationship with the lowest surface of the vehicle battery so that the lowest circumferential point of the roller is lower than the lowest surface of the vehicle battery, and which is aligned so that when the vehicle battery is fully inserted into the battery compartment, the roller drops into the recess in the battery platform so that the lowest surface of the vehicle battery then rests in load bearing engagement with the battery platform and the roller is no longer in load bearing engagement with the battery platform.

2. A mounting system as claimed in claim 1, wherein the edge of the recess has an inclined surface, which extends between the upper surface of the battery platform and the recessed part of the battery platform, and which is positioned to allow the roller to run along the inclined surface as the battery mount moves into or out of the battery compartment, in order to reduce the lateral force required to move the vehicle battery from the position in which the roller is in the recess, to the position in which the roller is rolling on the battery platform surface.

3. A mounting system as claimed in claim 1, wherein the battery platform includes a longitudinal groove which extends from the recess to the entrance to the battery compartment, and which is laterally aligned with the roller, and wide enough to accept the full width of the roller, so that the roller runs in the groove as the battery mount moves into or out of the battery compartment thereby guiding the lateral position of the roller during rolling before it drops into the recessed part.

4. A battery mount system comprising:
a battery;
a battery compartment having a battery platform which forms the lower surface of the battery compartment and which has a recess; and
a roller mount fixed to the battery and having a roller which maintains the roller in a fixed relationship with the lowest surface of the battery so that the lowest circumferential point of the roller is lower than the lowest surface of the battery, and which is aligned so that when the battery is fully inserted into the battery compartment, the roller drops into the recess in the battery platform so that the lowest surface of the battery then rests in load bearing engagement with the battery platform and the roller is no longer in load bearing engagement with the battery platform.

5. A system as claimed in claim 4, wherein the edge of the recess has an inclined surface, which extends between the upper surface of the battery platform and the recessed part of the battery platform, and which is positioned to allow the roller to run along the inclined surface as the battery mount moves into or out of the battery compartment, in order to reduce the lateral force required to move the battery from the position in which the roller is in the recess, to the position in which the roller is rolling on the battery platform surface.

6. A system as claimed in claim 4, wherein the battery platform includes a longitudinal groove which extends from the recess to the entrance to the battery compartment, and which is laterally aligned with the roller, and wide enough to accept the full width of the roller, so that the roller runs in the groove as the battery mount moves into or out of the battery compartment thereby guiding the lateral position of the roller during rolling before it drops into the recessed part.

* * * * *